UNITED STATES PATENT OFFICE.

DECIUS W. CLARK, OF CHICAGO, ILLINOIS.

IMPROVEMENT IN ENAMELING GAS-RETORTS, &c.

Specification forming part of Letters Patent No. 114,763, dated May 16, 1871.

*To all whom it may concern:*

Be it known that I, DECIUS W. CLARK, of the city of Chicago, county of Cook, and State of Illinois, have invented certain Improvements in Enameling Gas-Retorts, &c., of which the following is a specification.

This invention pertains to the coating of retorts, carbon-pipes, and all similar apparatus combined with the manufacture of gas, and has for its object the rendering of such articles, first, gas-tight or non-porous, so that no wastage of the ingredients to be treated may escape through the pores of the retort or conveyers; second, producing such a surface upon the interior of said articles as to effectually prevent the accumulation of carbon or carbonaceous substances on said surfaces, which at certain temperatures are very destructive to such articles, and by the accumulation thereof greatly interfere with the operation of distillation. For similar reasons such articles may be coated on the exterior surfaces, as may be desired.

My method of producing such important results is accomplished by forming a wash for coating said retorts previous to their being placed in the kiln to be baked or "burned," as follows: I take any of the common clay— such as tile or common brick is made of, or, what is preferable, a clay known as the "Albany slip," which does not contain so large a percentage of iron, and which is also found in Ohio and Iowa, and perhaps a few other places— and without any previous preparation dissolve so much of said clays in water and to such a degree as to form a wash of about the consistency of cream, or any degree that may be easily applied either by brushes or in any other convenient manner. This wash I apply to the surface of the article to be coated, generally previous to baking or burning the retort-pipe, &c., as it thereby saves one extra heating, and I find that in some clays from which retorts, &c., are made it is better to apply the wash when they are comparatively green, or before they are nearly dry enough to place in the kiln.

When retorts are so washed and with such a composition it will be found that a glacial coating, perfectly non-porous, will be formed upon the surface of said retorts, &c., during the process of baking or burning them in the kiln.

I claim—

The process herein described for enameling retorts and other like articles by fusing upon them a coating of clay, substantially as described.

DECIUS W. CLARK.

Witnesses:
CHARLES H. LEONARD,
BOYD ELIOT.